(12) United States Patent
Buhl et al.

(10) Patent No.: US 8,684,381 B2
(45) Date of Patent: Apr. 1, 2014

(54) STABILIZER FOR A UTILITY VEHICLE

(75) Inventors: Manfred Buhl, Bissendorf (DE);
Friedhelm Langhorst, Diepholz (DE);
Bernhard Eilers, Breddenberg (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 225 days.

(21) Appl. No.: 12/999,793

(22) PCT Filed: Jun. 17, 2009

(86) PCT No.: PCT/DE2009/050030
§ 371 (c)(1),
(2), (4) Date: Dec. 17, 2010

(87) PCT Pub. No.: WO2009/152821
PCT Pub. Date: Dec. 23, 2009

(65) Prior Publication Data
US 2011/0089658 A1   Apr. 21, 2011

(30) Foreign Application Priority Data
Jun. 19, 2008   (DE) .......... 10 2008 002 524

(51) Int. Cl.
*B60G 21/055* (2006.01)
(52) U.S. Cl.
USPC ...... 280/124.107; 280/124.106; 280/124.166; 280/124.13
(58) Field of Classification Search
USPC ............ 280/5.502, 5.511, 124.106, 124.107, 280/124.13, 124.166; 180/89.13; 296/190.04, 190.06
See application file for complete search history.

(56) References Cited

U.S. PATENT DOCUMENTS

| 2,565,756 | A | * | 8/1951 | Coleman | 280/104 |
| 2,738,185 | A | * | 3/1956 | Coskun | 267/273 |
| 2,768,002 | A | * | 10/1956 | Rabe et al. | 280/124.13 |
| 3,033,555 | A | * | 5/1962 | Stoll | 267/284 |
| 3,197,233 | A | * | 7/1965 | Bauer et al. | 280/5.502 |
| 3,207,497 | A | * | 9/1965 | Schoonover | 267/283 |
| 3,963,261 | A | * | 6/1976 | Hiruma | 280/683 |
| 4,234,205 | A | * | 11/1980 | Thiesce | 280/124.107 |

(Continued)

FOREIGN PATENT DOCUMENTS

| DE | 27 26 097 A1 | 12/1978 |
| DE | 195 33 478 C1 | 1/1997 |

(Continued)

OTHER PUBLICATIONS

Machine translation of DE2726097 Retrieved from the internet. URL: <http://translationportal.epo.org/emtp/translate/?ACTION=description-retrieval&COUNTRY=DE&ENGINE=google&FORMAT=docdb&KIND=A1&LOCALE=en_EP&NUMBER=2726097&OPS=ops.epo.org&SRCLANG=de&TRGLANG=en>.*

*Primary Examiner* — Drew Brown
*Assistant Examiner* — Barry Gooden, Jr.
(74) *Attorney, Agent, or Firm* — Michael J. Bujold; David & Bujold, PLLC

(57) ABSTRACT

A stabilizer bar for a commercial vehicle which comprises an elongate torsion spring (5), two suspension arms (6, 7) which are securely connected to and extend away from the torsion spring (5) and, between which the torsion spring (5) extends. An actuator (12) is connected in parallel with the torsion spring (5) and is connected to the torsion spring (5) or the suspension arms (6, 7) with the intermediate connection of hinge joints (23, 25) or leaf springs (17, 19).

17 Claims, 4 Drawing Sheets

(56) References Cited

U.S. PATENT DOCUMENTS

| | | | |
|---|---|---|---|
| 4,291,895 A * | 9/1981 | Wohrle et al. | 280/124.134 |
| 4,521,033 A * | 6/1985 | Lenhard-Backhaus et al. | 280/124.102 |
| 4,544,180 A * | 10/1985 | Maru et al. | 280/124.106 |
| 4,596,401 A * | 6/1986 | Jullien | 280/124.128 |
| 4,648,620 A | 3/1987 | Nuss | |
| 4,652,010 A * | 3/1987 | Sugasawa | 280/5.511 |
| 4,863,148 A * | 9/1989 | Hufnagel | 267/278 |
| 4,867,474 A * | 9/1989 | Smith | 280/5.507 |
| 5,409,254 A * | 4/1995 | Minor et al. | 280/124.166 |
| 5,505,479 A * | 4/1996 | Lee | 280/124.107 |
| 6,702,265 B1* | 3/2004 | Zapletal | 267/187 |
| 7,237,785 B2* | 7/2007 | Kraus et al. | 280/124.106 |
| 7,798,508 B2* | 9/2010 | Wettlaufer, Jr. | 280/124.152 |
| 7,862,059 B2* | 1/2011 | Ko | 280/124.116 |
| 2001/0004149 A1* | 6/2001 | Fujiki et al. | 280/124.135 |
| 2005/0073124 A1* | 4/2005 | Lundmark | 280/124.13 |
| 2006/0261639 A1* | 11/2006 | Biasiotto et al. | 296/190.07 |
| 2008/0042377 A1* | 2/2008 | Beetz et al. | 280/5.511 |
| 2008/0195278 A1* | 8/2008 | Becker et al. | 701/37 |
| 2010/0107918 A1 | 5/2010 | Hess | |
| 2010/0253019 A1* | 10/2010 | Ogawa | 280/5.511 |
| 2011/0049818 A1* | 3/2011 | Van der Knaap et al. | 280/5.508 |
| 2011/0089658 A1* | 4/2011 | Buhl et al. | 280/124.106 |

FOREIGN PATENT DOCUMENTS

| | | |
|---|---|---|
| DE | 10 2004 059 274 A1 | 6/2006 |
| DE | 10 2006 051 682 A1 | 2/2008 |
| DE | 10 2007 007 417 A1 | 8/2008 |
| DE | 10 2007 028 852 A1 | 12/2008 |
| EP | 1 886 850 A1 | 2/2008 |
| EP | 2 065 232 A1 | 6/2009 |
| EP | 2 065 233 A1 | 6/2009 |
| GB | 2 388 826 A | 11/2003 |
| JP | 9-030235 A | 2/1997 |
| JP | 2000-313218 A | 11/2000 |
| WO | 2004/103802 A2 | 12/2004 |

* cited by examiner

STABILIZER FOR A UTILITY VEHICLE

This application is a National Stage completion of PCT/DE2009/050030 filed Jun. 17, 2009, which claims priority from German patent application serial no. 10 2008 002 524.0 filed Jun. 19, 2008.

FIELD OF THE INVENTION

The invention relates to a stabilizer for a utility vehicle, comprising an elongated torsion spring and two suspension arms which are securely connected to the torsion spring and extend away therefrom, and between which the torsion spring extends.

BACKGROUND OF THE INVENTION

U.S. Pat. No. 4,648,620 discloses a stabilizer bar for a commercial vehicle that comprises a torsion spring bar, on each end of which an angled arm is disposed. The arms are connected by joints to a vehicle axle. The torsion spring bar extends through a two-piece torsion spring tube, the outer ends of which are welded to the torsion spring bar. The two parts of the torsion spring tube can be detachably interconnected using an actuatable coupling.

In many commercial vehicles, the driver's cab is connected in the front region thereof to the vehicle frame by a stabilizer bar to prevent roll. This stabilizer bar is composed of two suspension arms or levers and a torsion bar which is either round, tubular, or designed as a profile, and interconnects the two suspension arms in a rotationally fixed manner. The disadvantage of this system is that driving comfort is greatly reduced by the extreme roll of the driver's cab despite the anti-roll stabilization, in particular when travel takes place on poorly maintained, flat, and curvy roadways. To improve driving comfort, there is a trend toward preventing or minimizing the roll of the driver's cab even in these situations by installing an additional active component (actuator) in the stabilizer bar. The cabin thereby remains level relative to the roadway. However, high bending moments and lateral forces generated during vehicle operation can result in wear and thereby significantly reduce the service life of the actuator or damage or destroy it, in particular if it comprises a hydraulic oscillating motor.

SUMMARY OF THE INVENTION

Proceeding therefrom, the problem addressed by the invention is that of developing a stabilizer bar of the initially described type such that the actuator is protected against damage caused by bending moments. Preferably, the actuator is also protected against damage caused by lateral forces.

The stabilizer bar according to the invention for a commercial vehicle, in particular a utility vehicle, comprises an elongated torsion spring, two suspension arms which are securely connected to the torsion spring and extend away therefrom, and between which the torsion spring extends, and an actuator which is connected in parallel with the torsion spring and is connected to the torsion spring or the suspension arms with the intermediate connection of hinge joints or leaf springs.

The use of hinge joints or leaf springs ensures that bending moments generated e.g. by lateral forces produced when cornering are transferred to the actuator not at all or only very slightly. On the other hand, rotational motions of the actuator can be transferred using the hinge joints or leaf springs.

Leaf springs are suitable for use in particular when pivoting angles are relatively small, and therefore leaf springs can also be considered as a simplified and cost-favorable joint design.

The actuator is preferably connected on both sides to the torsion spring or the suspension arms with the intermediate connection of hinge joints or leaf springs. In particular, the actuator is connected to the suspension arms or the ends of the torsion spring with the intermediate connection of hinge joints or leaf springs.

The actuator is a rotational actuator in particular. Preferably the actuator comprises two machine parts which can rotate relative to one another and are connected to the hinge joints or leaf springs. The two machine parts are preferably rotated relative to one another about a rotational axis by actuating the actuator. In particular, the machine parts of the actuator are connected to the torsion spring or the suspension arms with the intermediate connection of hinge joints or leaf springs. The actuator preferably comprises a motor or an oscillating motor which is a hydraulic oscillating motor in particular. A hydraulic oscillating motor can generate high torques relatively quickly despite being relatively compact. The machine parts can be connected to the oscillating motor or be part of the oscillating motor. For example, one of the first machine parts is a rotor, and one of the second machine parts is a stator of the oscillating motor. Furthermore, it is possible for at least one of the machine parts to be connected to the oscillating motor with the intermediate connection of a transmission.

The suspension arms preferably extend away from the torsion spring at an angle. In particular, the suspension arms are oriented obliquely, perpendicularly, or substantially perpendicularly to the torsion spring. The suspension arms, in combination with the torsion spring, preferably form a U section. In particular, each of the suspension arms is connected to the torsion spring in a rotationally fixed manner.

The hinge axes of the hinge joints are preferably oriented perpendicularly or substantially perpendicularly to the longitudinal axis of the torsion spring and/or to the rotational axis of the actuator. Furthermore, the leaf planes of the leaf springs are preferably oriented perpendicularly or substantially perpendicularly to the longitudinal axis of the torsion spring and/or to the rotational axis of the actuator.

The actuator is preferably connected to the hinge joints or leaf springs with the intermediate connection of at least one elongated actuating element. In particular, the at least one actuating element is formed by a tube or bar and preferably has a round cross section. Furthermore, the at least one actuating element can be designed as a torsion spring. According to one development, the actuator is installed between two actuating elements which connect it to the hinge joints or leaf springs.

The leaf springs can be connected to the actuator without play. Furthermore, the leaf springs can be connected to the suspension arms without play. Bolt connections, threaded connections, or clamped connections, for example, can be used to establish the play-free connections. For example, the leaf springs are connected to the actuator and/or the suspension arms using form-locking connections supplemented by a threaded connection, or using friction-locking or force-locking clamped connections using screws. Other possibilities include form-locking or force-locking connections using conical-seat or ball-seat screws, which are used to mount wheels. Preferably the leaf springs are connected to the actuator as well as the suspension arms using threaded connections. In particular, each of the threaded connections comprises at least two, preferably three screws.

The torsion spring is preferably formed by a tube, in particular a tube comprising at least one longitudinal groove. As a result, a very slight torsional or residual stiffness can be attained, thereby ensuring e.g. that the stabilizer bar can operate even if the actuator or the oscillating motor fails (fail-safe behavior of the stabilizer bar). As an alternative, low torsional stiffness can also be attained using an open profile. The cross section of the torsion spring is preferably round. According to a first variant of the invention, the actuator is disposed outside of the torsion spring and at a distance therefrom. In this case, the rotational axis of the actuator or the oscillating motor is preferably oriented parallel to the longitudinal axis of the torsion spring. According to a second variant, the actuator is installed in an interior space of the torsion spring. In this case, the rotational axis of the actuator or the oscillating motor preferably coincides with the longitudinal axis or longitudinal center axis of the torsion spring.

The torsion spring is preferably supported on a driver's cab of the commercial vehicle, the suspension arms being connected to a vehicle frame of the commercial vehicle. In particular, the torsion spring is supported on the driver's cab, preferably such that it can rotate about the longitudinal axis or the longitudinal center axis of the torsion spring. The torsion spring is attached to the driver's cab e.g. using pivot bearings which are preferably provided with a sliding layer composed of a sliding material to absorb a pivot motion, and with a rubber layer for damping. In particular, the torsion spring is attached to the driver's cab using hinges or rubber slide bearings. The suspension arms are connected to the vehicle frame e.g. using rubber bearings. Vibrations can thus be dampened and decoupled.

According to an alternative, the torsion spring is supported on the vehicle frame of the commercial vehicle, the suspension arms being connected to the driver's cab of the commercial vehicle. In particular, the torsion spring is supported on the vehicle frame, preferably such that it can rotate about the longitudinal axis or the longitudinal center axis of the torsion spring. The torsion spring is attached to the vehicle frame e.g. using pivot bearings which are preferably provided with a sliding layer composed of a sliding material to absorb pivot motion, and with a rubber layer for damping. In particular, the torsion spring is attached to the driver's cab using hinges or rubber slide bearings. The suspension arms are connected to the driver's cab e.g. using rubber bearings.

According to an embodiment, the stabilizer bar according to the invention is composed of two lever arms and one connecting tube provided with at least one longitudinal groove. By way of this groove or these grooves, the stabilizer bar is provided with very low torsional stiffness (residual stiffness) while retaining flexural rigidity. As an alternative, this may be attained by using an open profile. An actuator connected on both sides to the stabilizer bar is disposed parallel to the stabilizer bar tube. However, since the hydraulic oscillating motor disposed in the actuator can only tolerate very low bending moments, a connection solution is used, according to which bending moments generated by rotation of the stabilizer bar and by lateral forces (cornering) do not act on the oscillating motor, or do so only slightly. This is achieved by the use of hinge joints or leaf springs installed on both sides of the actuator.

The use of hinge joints or leaf springs enables torque to be transferred from the oscillating motor to the stabilizer bar. Advantageously, the transfer of bending moments generated by rotation and lateral forces (cornering) to the oscillating motor are prevented by joints and minimized by leaf springs. Another advantage of leaf springs is that they can be installed entirely without play. To accomplish this, manners of fastening such as bolt connections (form-locked connection using an interference fit) supplemented by a threaded connection, threaded connections using conical-seat or ball-seat screws (form-locked and friction-locked connection) or purely clamped/threaded connections (friction-locked connection). Furthermore, the use of leaf springs makes it possible to easily replace the actuator.

The invention furthermore relates to the use of a stabilizer bar according to the invention for anti-roll stabilization of a driver's cab of a commercial vehicle. To that end, the driver's cab is preferably connected to a vehicle frame of the commercial vehicle using the stabilizer bar. The driver's cab is stabilized against roll relative to the vehicle frame in particular.

Furthermore, the invention relates to a commercial vehicle, in particular a utility vehicle comprising a vehicle frame and a driver's cab which is connected to the vehicle frame using a stabilizer bar according to the invention.

BRIEF DESCRIPTION OF THE DRAWINGS

The invention is described below using preferred embodiments, with reference to the drawing. In the drawing.

DETAILED DESCRIPTION OF THE PREFERRED EMBODIMENTS

Figure 1:
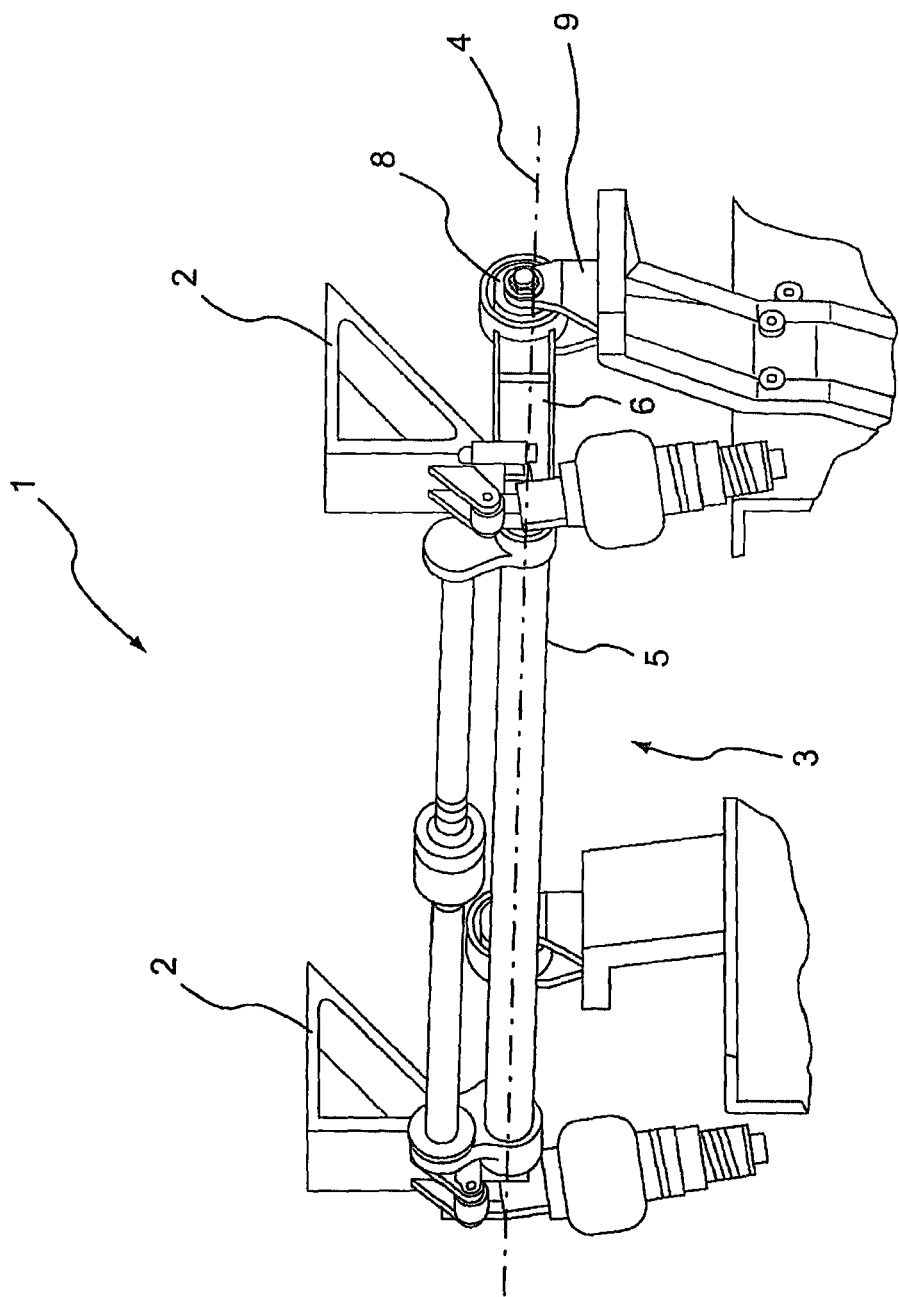
FIG. 1 shows a partially perspective illustration of a commercial vehicle comprising a stabilizer bar according to a first embodiment of the invention.

FIG. 1 shows a partially perspective view of a commercial vehicle 1 comprising a driver's cab 2, on which a stabilizer bar 3 according to a first embodiment of the invention is supported such that it can rotate about an axis 4. The stabilizer bar 3 comprises an elongated torsion spring 5, the longitudinal axis of which coincides with the axis 4. The suspension arms 6 and 7 (see FIG. 2) are connected to the ends of the torsion spring 5 in a rotationally fixed manner, and are connected to a vehicle frame 9 of the commercial vehicle 1 at a distance from the torsion spring 5 with rubber bearings 8 installed therebetween.

Figure 2:
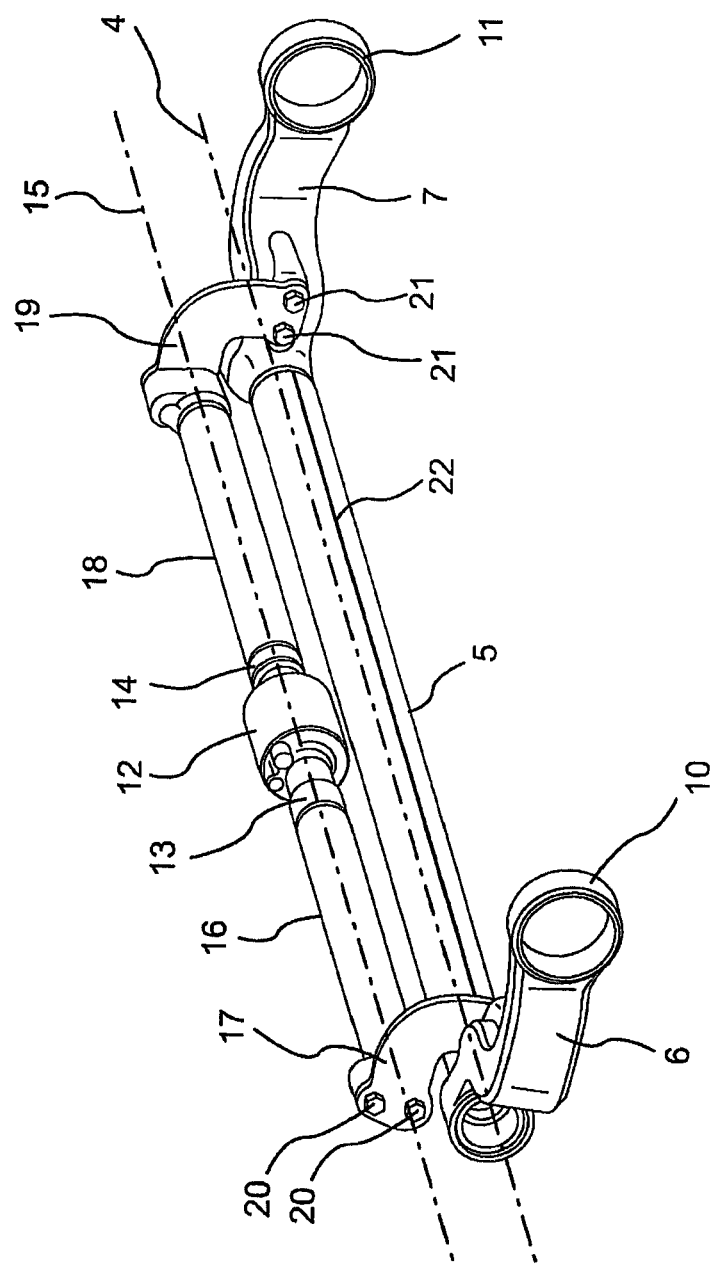
FIG. 2 shows a perspective view of the stabilizer bar according to the first embodiment.

FIG. 2 shows a perspective illustration of the stabilizer bar 3 according to the first embodiment, wherein bearing seats 10 and 11 are formed on the ends of the suspension arms 6 and 7 facing away from the torsion spring 5 to accommodate the rubber bearings 8. The stabilizer bar 3 comprises an actuator 12 designed as a hydraulic oscillating motor which is used to rotate two machine parts 13 and 14 relative to one another about an axis 15 which is oriented parallel to the axis 4. The machine part 13 is connected to one end of a connecting tube 16 in a rotationally fixed manner, the other end of which is connected to a leaf spring 17 in a rotationally fixed manner. Furthermore, the machine part 14 is connected to one end of a connecting tube 18 in a rotationally fixed manner, the other end of which is connected to a leaf spring 19 in a rotationally fixed manner. The connecting tube 16 is connected to the leaf spring 17 in a rotationally fixed manner using threaded connections 20. The connecting tube 18 is screwed together with the leaf springs 19 in a similar manner.

The leaf planes of the leaf springs 17 and 19 extend parallel to one another and are oriented perpendicularly to the axes 4 and/or 15. Furthermore, the leaf springs 17 and 19 are angled, or the leaf springs 17 and 19 approximately extend in a quarter circle. The end of the leaf spring 19 facing away from the connecting tube 18 is connected to the suspension arm 7 using threaded connections 21. The end of the leaf spring 17 facing away from the connecting tube 16 is screwed together with the suspension arm 6 in a similar manner. The torsion spring 5 comprises a longitudinal groove 22, thereby ensuring that the torsion spring 5 has low torsional stiffness in combination with high flexural rigidity.

Figure 3:
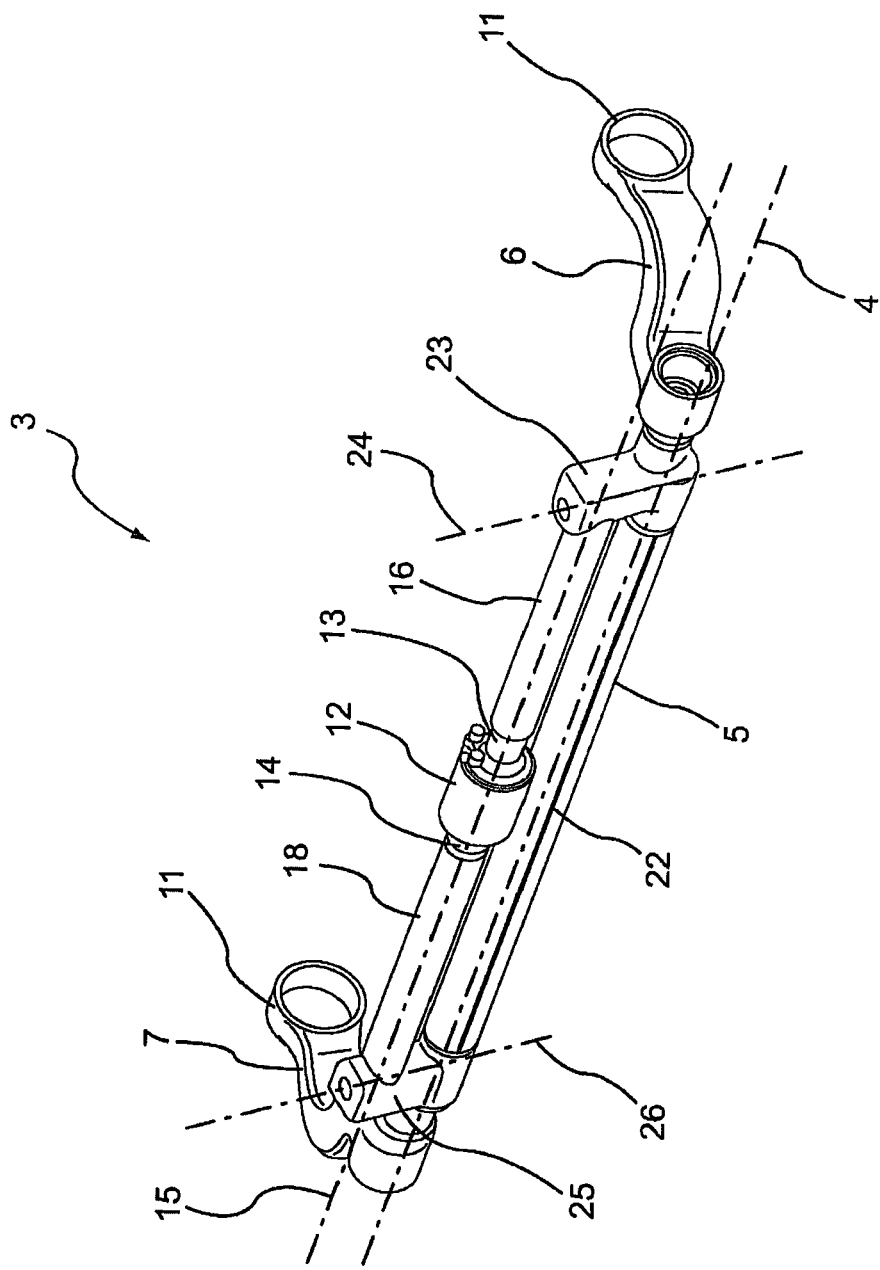
FIG. 3 shows a perspective view of a stabilizer bar according to a second embodiment of the invention.

FIG. 3 shows a perspective view of a stabilizer bar 3 according to a second embodiment of the invention, wherein features that are similar or identical to those of the first embodiment are labeled using the same reference characters as in the first embodiment. The end of the connecting tube 16 facing away from the machine part 13 is connected to one end of the torsion spring 5 using a hinge joint 23, wherein the hinge joint 23 has a hinge axis 24 oriented perpendicularly to the rotational axis 15 of the actuator. Furthermore, the end of the connecting tube 18 facing away from the machine part 14 is connected to the other end of the torsion spring 5 using a hinge joint 25, wherein the hinge joint 25 has a hinge axis 26 oriented perpendicularly to the rotational axis 15 of the actuator. Thus, the leaf springs according to the first embodiment are replaced by the hinge joints in this case. Reference is made to the description of the first embodiment for the further description of the second embodiment.

Figure 4:
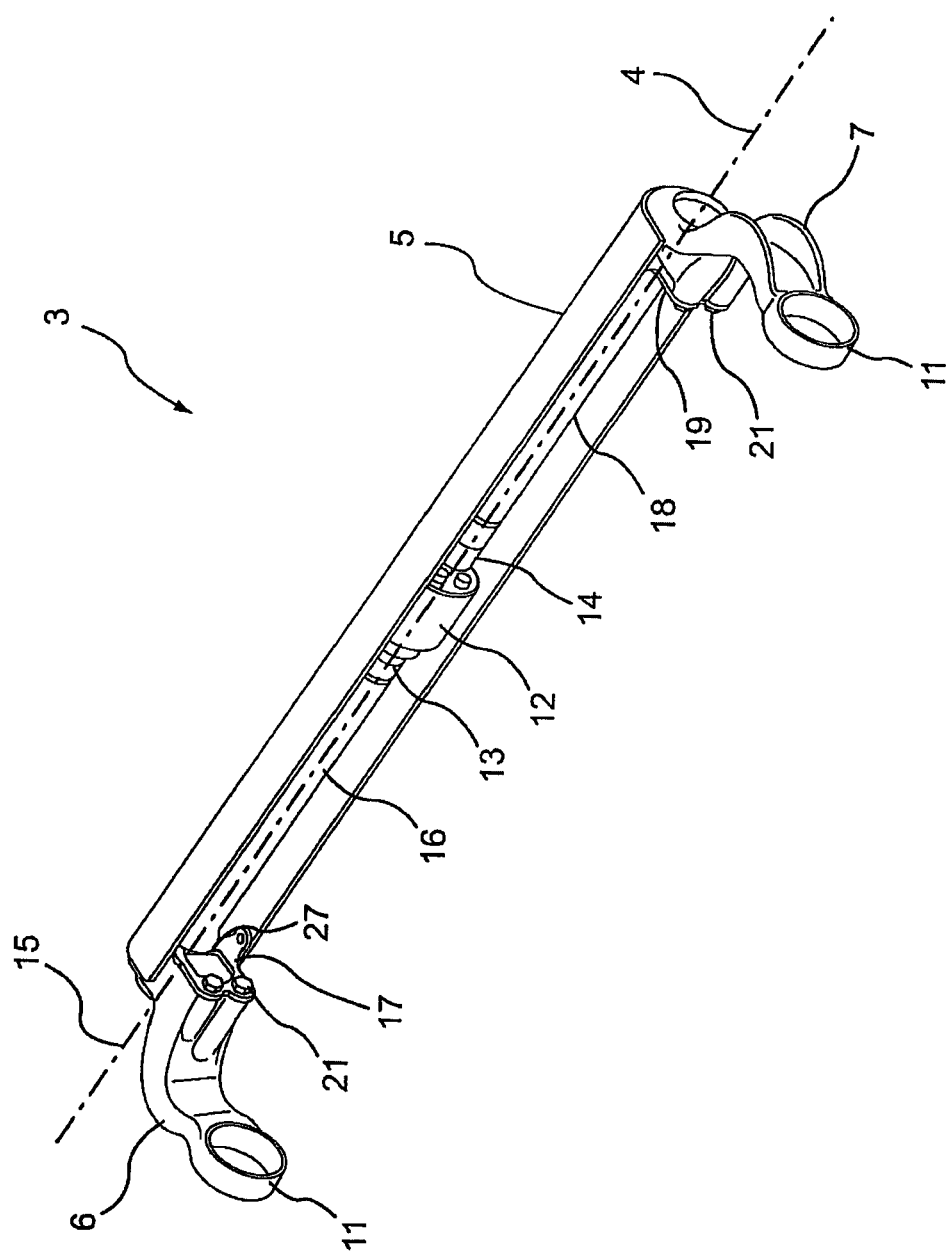
FIG. 4 shows a perspective view of a stabilizer bar according to a third embodiment of the invention.

FIG. 4 shows a perspective view of a stabilizer bar 3 according to a third embodiment of the invention, wherein features that are similar or identical to those of the first embodiment are labeled using the same reference characters as in the first embodiment. The torsion spring 5 is designed as an open channel section, in the interior of which the actuator 12 extends together with the machine parts 13 and 14 and the connecting tubes 16 and 18. The rotational axis 15 of the actuator 12 coincides with the longitudinal axis 4 of the torsion spring 5 in this case. The end of the connecting tube 16 facing away from the machine part 13 is connected to the leaf spring 17 in a rotationally locked manner using spur gearing 27, in particular Hirth serration. In a similar manner, the end of the connecting tube 18 facing away from the machine part 14 is connected to the leaf spring 19 in a rotationally locked manner. As in the first embodiment, the leaf springs 17 and 19 are connected to the suspension arms 6 and 7 using threaded connections 21. Reference is made to the description of the first embodiment for the further description of the third embodiment.

Although the actuator shown in the embodiments is disposed in the center between the leaf springs or hinge joints, the actuator can also be disposed off-center or on the side, as an alternative. In this case, it is even possible to omit one of the connecting tubes if the actuator is fastened directly to one of the leaf springs or one of the hinge joints.

LIST OF REFERENCE CHARACTERS 1 commercial vehicle
2 driver's cab
3 stabilizer bar
4 longitudinal axis of the torsion spring
5 torsion spring
6 suspension arm
7 suspension arm
8 rubber bearing
9 vehicle frame
10 bearing seat
11 bearing seat
12 actuator
13 machine part
14 machine part
15 rotational axis of the actuator
16 connecting tube
17 leaf spring
18 connecting tube
19 leaf spring
20 threaded connection
21 threaded connection
22 longitudinal groove
23 hinge joint
24 hinge axis
25 hinge joint
26 hinge axis
27 gearing

The invention claimed is:

1. A stabilizer bar for a commercial vehicle, the stabilizer bar comprising:
an elongated torsion spring (5) having a longitudinal axis (4);
two suspension arms (6, 7) being securely connected to the torsion spring (5) and extending away therefrom, and the elongated torsion spring (5) being located between the two suspension arms (6, 7);
an actuator (12) being connected in parallel with the torsion spring (5) and being connected to one of the torsion spring (5) and the two suspension arms (6, 7) by an intermediate connection of either hinge joints (23, 25) or leaf springs (17, 19); and
the actuator (12) having a rotational axis (15) which one of extends parallel to and is coincident with the longitudinal axis (4) of the torsion spring (5);
wherein the actuator (12) is installed in an interior space of the torsion spring (5).

2. The stabilizer bar according to claim 1, wherein the two suspension arms (6, 7) are oriented either perpendicularly or substantially perpendicularly to the longitudinal axis (4) of the torsion spring (5).

3. The stabilizer bar according to claim 1, wherein the intermediate connection is the leaf springs (17, 19), and leaf planes of the leaf springs (17, 19) are oriented either perpendicularly or substantially perpendicularly to at least one of the longitudinal axis (4) of the torsion spring (5) and the rotational axis (15) of the actuator (12).

4. The stabilizer bar according to claim 1, wherein the actuator (12) comprises a hydraulic oscillating motor.

5. The stabilizer bar according to claim 1, wherein the intermediate connection is the leaf springs (17, 19), and the leaf springs (17, 19) are connected to the actuator (12) as well as the suspension arms (6, 7) by threaded connections (20, 21).

6. The stabilizer bar according to claim 1, wherein the torsion spring (5) is formed by a tube comprising at least one longitudinal groove (22).

7. The stabilizer bar according to claim 1, wherein the torsion spring (5) has an open profile.

8. The stabilizer bar according to claim 1, wherein the actuator (12) is disposed outside of the torsion spring (5).

9. The stabilizer bar according to claim 1, wherein the actuator (12) is connected on both sides to either the suspension arms (6, 7) or ends of the torsion spring (5) with the intermediate connection of either the hinge joints (23, 25) or the leaf springs (17, 19).

10. The stabilizer bar according to claim 1, wherein the actuator (12) comprises two machine parts (13, 14) which rotate relative to one another and are connected to either the hinge joints (23, 25) or the leaf springs (17, 19), and which are rotatable relative to one another about the rotational axis (15) by actuation of the actuator (12).

11. The stabilizer bar according to claim 10 wherein the two machine parts (13, 14) are installed in the interior space of the torsion spring (5) along with the actuator (12).

12. The stabilizer bar according to claim 1, wherein the actuator (12) is connected to either the hinge joints (23, 25) or the leaf springs (17, 19) by an intermediate connection of at least one elongated actuating element (16, 18).

13. The stabilizer bar according to claim 12, wherein the at least one actuating element (16, 18) is formed by either a round tube or a bar.

14. A stabilizer bar for a commercial vehicle, the stabilizer bar comprising:
an elongated torsion spring (5) having a longitudinal axis (4);
two suspension arms (6, 7) being securely connected to the torsion spring (5) and extending away therefrom, and the elongated torsion spring (5) being located between the two suspension arms (6, 7);
an actuator (12) being connected in parallel with the torsion spring (5), first ends of first and second machine parts (13 and 14), which are rotatable relative to one another by the actuator (12) about a rotational axis (15) defined by the actuator (12), each being respectively connected with the actuator (12) while second ends of each of the first and the second machine parts (13 and 14), being respectively connected to one of the torsion spring (5) and the two suspension arms (6, 7) by intermediate connections comprising one of hinge joints (23, 25) or leaf springs (17, 19); and
the rotational axis (15) one of extends parallel to and is coincident with the longitudinal axis (4) of the torsion spring (5);
wherein the intermediate connection is the hinge joints (23, 25), and hinge axes (24, 26) of the hinge joints (23, 25) are oriented either perpendicularly or substantially perpendicularly to at least one of the longitudinal axis (4) of the torsion spring (5) and the rotational axis (15) of the actuator (12).

15. A stabilizer bar for a commercial vehicle, the stabilizer bar comprising:
an elongated torsion spring (5);
two suspension arms (6, 7) being securely connected to the torsion spring (5) and extending away therefrom, and the elongated torsion spring (5) being located between the two suspension arms (6, 7);
an actuator (12) being connected in parallel with the torsion spring (5), first ends of first and second machine parts (13 and 14), which are rotatable relative to one another by the actuator (12) about a rotational axis (15) defined by the actuator (12), each being respectively connected with the actuator (12) while second ends of each of the first and the second machine parts (13 and 14), being respectively connected, by a respective connecting tube (16 or 18), to one of the torsion spring (5) and the two suspension arms (6, 7) by intermediate connections comprising one of hinge joints (23, 25) or leaf springs (17, 19); and
the torsion spring (5) is rotatably supported on a cab (2) of the commercial vehicle (1), and the two suspension arms (6, 7) are connected to a vehicle frame (9) of the commercial vehicle (1).

16. The stabilizer bar according to claim 15 wherein each of the two suspension arms (6, 7) is directly connected to the vehicle at two separate spaced apart locations.

17. A stabilizer bar for a commercial vehicle, the stabilizer bar comprising:
an elongated torsion spring (5);
two suspension arms (6, 7) being securely connected to the torsion spring (5) and extending away therefrom, and the elongated torsion spring (5) being located between the two suspension arms (6, 7);
an actuator (12) being connected in parallel with the torsion spring (5), first ends of first and second machine parts (13 and 14), which are rotatable relative to one another by the actuator (12) about a rotational axis (15) defined by the actuator (12), each being respectively connected with the actuator (12) while second ends of each of the first and the second machine parts (13 and 14), being respectively connected, by a respective connecting tube (16 or 18), to one of the torsion spring (5) and the two suspension arms (6, 7) by intermediate connections comprising one of hinge joints (23, 25) or leaf springs (17, 19); and
each of the hinge joints (23, 25) or leaf springs (17, 19) being connected to the commercial vehicle via an associated one of the two suspension arms (6, 7).

* * * * *